(12) United States Patent
Lai et al.

(10) Patent No.: US 9,444,506 B2
(45) Date of Patent: Sep. 13, 2016

(54) WATERPROOF CASE

(71) Applicant: CATALYST LIFESTYLE LIMITED, North Point (HK)

(72) Inventors: June Lai, Hong Kong (CN); Joshua Wright, Hong Kong (CN)

(73) Assignee: CATALYST LIFESTYLE LIMITED, North Point, Hong Kong (CN)

( * ) Notice: Subject to any disclaimer, the term of this patent is extended or adjusted under 35 U.S.C. 154(b) by 0 days.

(21) Appl. No.: 14/684,850

(22) Filed: Apr. 13, 2015

(65) Prior Publication Data

US 2015/0295617 A1 Oct. 15, 2015

Related U.S. Application Data

(60) Provisional application No. 61/978,452, filed on Apr. 11, 2014.

(51) Int. Cl.
*H04B 1/38* (2015.01)
*H04M 1/26* (2006.01)
*H04B 1/3888* (2015.01)

(52) U.S. Cl.
CPC ..... *H04B 1/3888* (2013.01); *H04B 2001/3894* (2013.01)

(58) Field of Classification Search
CPC .............. H04B 1/3888; H04B 2001/3894; H05K 5/00; H05K 5/06; H05K 5/02; B65D 43/00
See application file for complete search history.

(56) References Cited

U.S. PATENT DOCUMENTS

| 7,180,735 B2 * | 2/2007 | Thomas | G06F 1/1626 206/701 |
| 7,907,394 B2 * | 3/2011 | Richardson | G06F 1/1613 312/223.1 |
| 7,941,196 B2 * | 5/2011 | Kawasaki | H04B 1/3888 379/428.01 |
| 8,164,899 B2 * | 4/2012 | Yamaguchi | G06F 1/1616 220/4.21 |
| 8,269,104 B2 * | 9/2012 | Choraku | H05K 5/061 174/50 |
| 2009/0009945 A1 | 1/2009 | Johnson et al. | |
| 2009/0215412 A1 * | 8/2009 | Liu | H04M 1/0249 455/90.3 |
| 2010/0311475 A1 * | 12/2010 | Takatsuka | H04M 1/0202 455/575.1 |
| 2011/0024315 A1 * | 2/2011 | Kim | H04M 1/18 206/320 |
| 2012/0043235 A1 | 2/2012 | Klement | |
| 2012/0099266 A1 * | 4/2012 | Reber | G06F 1/1632 361/679.26 |
| 2012/0325723 A1 | 12/2012 | Carnevali | |
| 2013/0271902 A1 | 10/2013 | Lai et al. | |
| 2014/0016217 A1 | 1/2014 | Rayner | |

(Continued)

OTHER PUBLICATIONS

International Search Report—Written Opinion, PCT/US15/25549, Dated Jul. 14, 2015, 8 pages.

*Primary Examiner* — Pablo Tran
(74) *Attorney, Agent, or Firm* — Dinsmore & Shohl LLP; Mark D. Schneider

(57) ABSTRACT

A protective case for an electronic device may include a housing, a case cover and a gasket positioned between the housing and the case cover. The housing may include a case member, having a plurality of housing snap attachment structures formed therein. The case cover may likewise include case cover snap attachment structures formed thereon that couple with the housing snap fit structures. The gasket is positioned between planar surfaces of the case member and case cover so that it is axially compressed between the case member and the case cover to provide a water and air tight seal, with the compression of the gasket being maintained by the connection of the housing snap attachment structures and the case cover snap attachment structures.

19 Claims, 14 Drawing Sheets

(56) References Cited

U.S. PATENT DOCUMENTS

2014/0066144 A1 3/2014 Hong

2015/0334855 A1* 11/2015 Chu .................. H05K 5/0086
224/191

* cited by examiner

WATERPROOF CASE

CROSS REFERENCE TO RELATED APPLICATIONS

This application claims priority to U.S. Provisional Application No. 61/978,452 filed on Apr. 11, 2014, titled Waterproof Case, the disclosure of which is incorporated herein by reference in its entirety.

FIELD OF THE INVENTION

Water and air sealed cases are disclosed for use with electronic devices, and particularly for use with tablet computer devices.

BACKGROUND OF THE INVENTION

Waterproof housings for electronic devices are known in the art. However waterproofing solutions that function well with smaller devices (e.g., mobile phones) may tend to function less well when scaled up and applied to larger devices (e.g., tablet computers). For example, the use of a radially compressed gasket works well with polycarbonate cases for phones. But, when applied to larger cases, radial compression may tend to cause the structure to flex and decrease the performance of the gasket seal. There is, therefore, a need for waterproof cases for larger devices that are lightweight and maintain an air and watertight seal. Improvements are also needed in the sound transmission for such cases.

SUMMARY OF THE INVENTION

A protective air and watertight case is disclosed for use with a predetermined electronic device, such as a tablet computer (e.g., an Apple® iPad®). The case may include at least a housing, a case cover, and also a case seal or gasket positioned between the case cover and the housing.

The housing may include a case member (or case rear or case bottom) into which may be received a predetermined electronic device. The housing may also optionally include other features (e.g., bumpers, buttons, and other over- or co-molded assemblies) that are formed/molded/chemically bonded and/or adhered to the case member that may function as protective elements, gaskets, and/or standoffs for the electronic device.

The case member of the housing may include a plurality of housing attachment structures and, optionally, one or more slots and ports formed therein. The housing attachment structures may be "snap" structures that may render an audible sound on engagement, or other manner of fixtures. Suitable examples of attachment structures include female cavity on the case member that, as will be discussed herein, may be engaged by complimentary male projections on the case cover.

The case member may also include a generally planar surface that extends around the perimeter of the case member. This planar perimeter surface may be positioned on the case member laterally inboard, or alternatively outboard, relative to the housing attachment structures of the case member.

The case member may also include a wall that defines an interior surface and an exterior surface. The wall may have a generally uniform thickness or, alternatively, areas of differing thickness. The wall, for example, may be dimensioned or otherwise shaped to define a recess on the interior surface of the case member where the wall has a thickness of 1.2 mm. Alternatively, the wall may have a thickness at the recess anywhere in a range between 0.2 and 1.6 mm, and it will be appreciated that the rest of the wall may have a thickness that is greater than the wall thickness at the recess. It will also be appreciated that the thinness of the wall at the recess, as will be explained infra, permits improved sound/audio transmission from the interior of the case to the exterior environment.

The wall of the case member may also be dimensioned to include a channel in the interior surface that extends from the recess to a position proximate a location of a speaker of the predetermined electronic device when the device is positioned in the case member. Alternatively, or additionally, the case member may include one or more standoff members that extend from the interior surface and are likewise dimensioned to position a predetermined electronic device in the case member so that a speaker of the device is spaced from the interior surface. The stand-off(s) may, for example, take the form of a plurality of molded rubber ribs co-molded with the case member. It may also be appreciated that other structures (e.g., flanges, pins, etc.) may be used as standoff members, and that such standoff members may be mounted to the case in a number of ways include being adhesively/glued and/or assembled. In operation, the channel and/or standoff(s) may form an air passage or pathway that allows audio transmissions from a speaker of the electronic device to move from the speaker, down to the recess, and then out to the environment through the thinner wall at the recess.

The case cover (or case front or top) may also include a plurality of case cover attachment structures shaped to couple with the housing attachment structures. Accordingly, it will be appreciated that the attachment structures of the case cover may be complimentary to the attachment structures on the case member. The case cover may also include a generally planar surface that extends around a perimeter of the case cover. The position of the planar surface of the case cover may be laterally inboard, or alternatively outboard, from the case cover attachment structures—and the case cover itself may be shaped so that, in an assembled configuration, the planar surface is directly opposite the planar surface of the case member.

The case cover may also include a screen, with the screen optionally including at least one port formed therein. One or more button features may also be positioned in the port of the screen.

The protective air and watertight case may be formed, in part, by removably joining the case member with the case cover. In joining the case member with the case cover it will be appreciated that the planar surfaces of each will be generally aligned with and opposed to each other. In addition, the planar surfaces of each structure may be shaped or otherwise dimensioned so that a space is formed between the two structures.

The case gasket may be attached to the case member, or the case cover, using mechanical, adhesive means or other means (e.g., over molding), and it may be shaped or otherwise dimensioned to extend into the space between the planar perimeter surfaces of the case cover and the case member. The case gasket, for example, may be formed as a separate member having a mounting portion and a sealing portion. The mounting portion may be mechanically secured to the case cover, or the case member, with the sealing portion extending into the space. The compression of the gasket may then be maintained by the connection of the housing attachment structures with the case cover attachment structures so that, in operation, the case gasket provides a water and airtight seal for the case.

The case member may also optionally include at least one membrane positioned in a slot of the case member proximate a location of a microphone of the predetermined electronic device when the device is positioned in the case member. The microphone membranes may be nonpermeable to water. The microphone membrane may also include a membrane gasket dimensioned to be contacted by the predetermined electronic device and space the device from the interior surface of the case member. The membrane, which may be formed of a TPU, PI, PEN, PTFE, PVDF, PET or PC material, may have a thickness of from 5 microns up to 2000 microns, a Young's Modulus from 50 MPa up to 80 Gpa, and a density from 500 kg/m3 up to 2500 kg/m3.

DETAILED DESCRIPTION OF THE PREFERRED EMBODIMENTS

Figure 1:
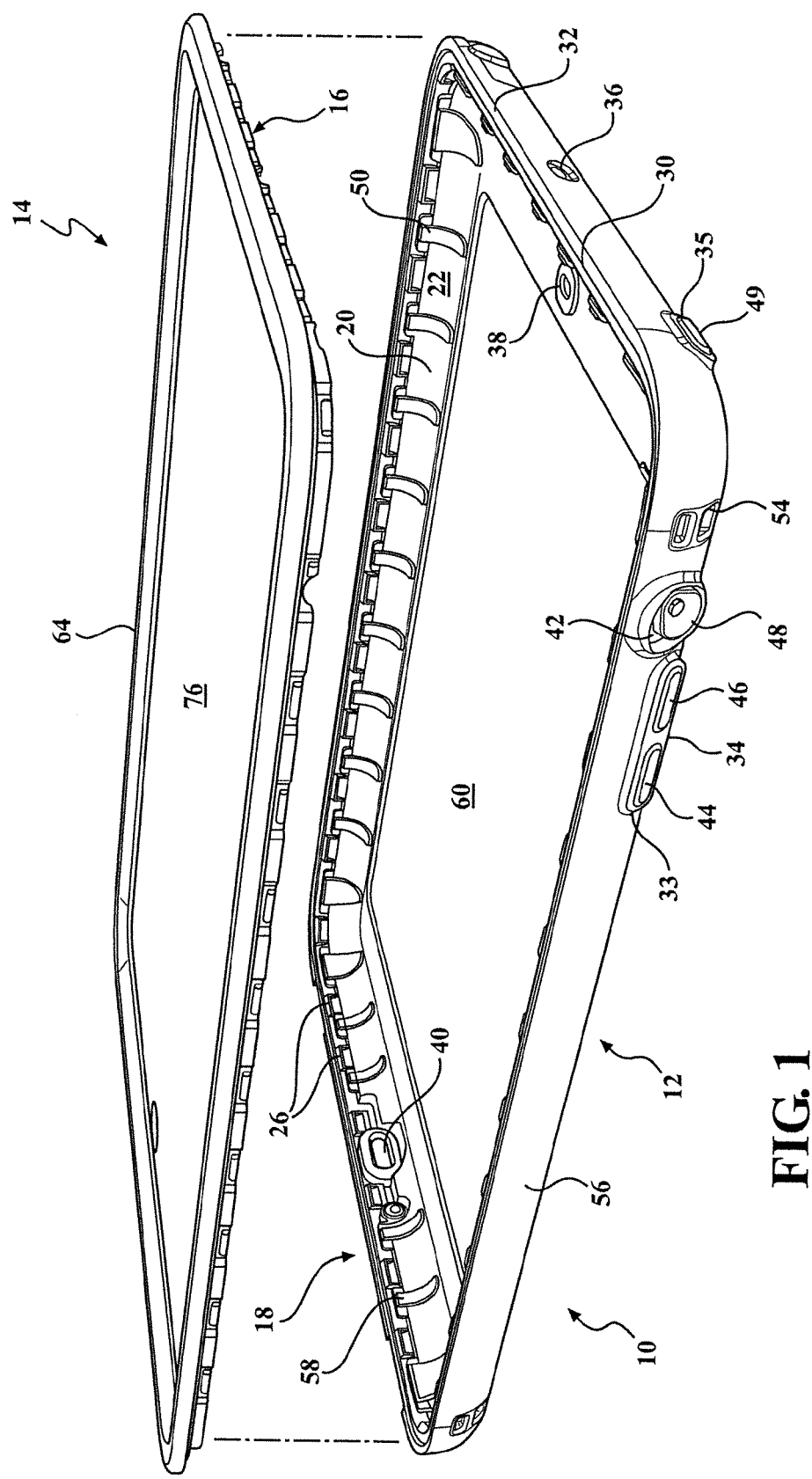
FIG. 1 is a perspective view of one embodiment of a protective air and water tight case in which an embodiment of a case cover with an associated case gasket is displayed unjoined from an embodiment of a case member.

Referring to the various figures, there are shown various embodiments of a waterproof case that may be used with a predetermined electronic device, such as a tablet computer (e.g., an Apple® iPad®). The case may include at least a housing, a case cover (or front or lid), and a case gasket positioned between the case cover and the housing.

Still referring to the various figures, the housing may include a case member (or case rear or bottom) into which the electronic device may be received and, optionally, other features formed/molded to the case member that may function as protective elements, gaskets and/or channels or standoffs for the device as will be described further below.

Still referring to the various figures, the case member may be formed of various materials to provide a rigid structure for the protective case. In one aspect, the case member may be formed of a clear material such as a clear plastic resin. Alternatively, other materials may be used that are not clear, such as other plastic resins or metal. Examples of acceptable materials for use in forming the case member include various plastic resins including polycarbonate, and other materials such as polycarbonate blends, acrylics, Tritan copolyester, PES, etc.

Still referring to the various figures, the case member may include a wall that defines an interior surface and an exterior surface for the case member, and that may optionally include various slots and access ports formed therein. The slots and access ports may be used to actuate various functions using buttons or switches and/or allow sound transmission, as will be described in more detail below. The case member may include sealing and locating material applied thereon on defined portions of the case member, such as about the slots and access ports to provide location and a sealing for the electronic device as well as allow access to various buttons of the electronic device as will be described in more detail below. In one aspect, the sealing and location material may include button features formed of various plastic elastomers such as a TPE-TPU material, or that may be formed of other materials.

Still referring to the various figures, the case member may include a plurality of housing attachment structures. The housing attachment structures may be "snap" structures that may render an audible sound on engagement, or other manner of fixtures. Suitable examples of attachment structures include a male projection or a female cavity position on the interior or exterior surface of the case member.

Still referring to the various figures, the wall of the case member may also define an upper surface that includes a generally planar surface that extends around a perimeter of the case member. This planar perimeter surface may be positioned laterally inboard, or alternatively outboard, relative to the housing attachment structures of the case member.

Still referring to the various figures, the wall of the case member may have a generally uniform thickness, or it may have areas of differing thickness. The wall, for example, may be dimensioned to define a recess on the interior surface of the case member having a thickness of 1.2 mm, or alternatively anywhere in a range between 0.2 and 1.6 mm.

Still referring to the various figures, the wall of the case member may also be dimensioned to define a channel in the interior surface that extends from the recess to a position proximate a location of a speaker of the predetermined electronic device when position in the case member. Or, alternatively, the case member may include one or more standoff members that extend from the interior surface and are dimensioned to position a predetermined electronic device in the case member so that a speaker of the electronic device is spaced from the interior surface. The stand-off(s) may, for example, take the form of a plurality of molded rubber ribs co-molded with the case member that project into the interior of the case member. It will be appreciated that other structures (e.g., flanges, pins, etc.) may also be used as standoff members. The standoff members may also be dimensioned so that an air passage or pathway is formed between the interior surface and the predetermined electronic device (when positioned in the case member) that extends from proximate a location of the speaker to the recess. Thus, it will be appreciated that channel or standoffs, and the resulting air pathway or passage may operate to create a path for sound from the speaker of the electronic device to move from the speaker, down to the recess, and then out to the environment through the thinner wall of the recess.

The case cover (or case front or top) may also have a body that is shaped to include a plurality of case cover attachment structures that couple with the attachment structures of the case member. The case cover may, for example, including a body having a vertical portion with a male projection(s) configured to engage a complimentary female cavity of the case member.

Still referring to the various figures, like the case member, the case cover may be formed of various materials to provide a rigid structure for the protective case. The case cover may, therefore, be formed of a clear material such as a clear plastic resin. Alternatively, other materials may be used that are not clear, such as other plastic resins or metal. Examples of acceptable materials for use in forming the case cover include various plastic resins, including polycarbonate, and other materials such as polycarbonate blends, acrylics, Tritan copolyester, PES, etc Still referring to the various figures, the case cover may also include a generally planar surface that extends around a perimeter of the case cover. Like the complimentary structure of the case member, the planar perimeter surface of the case cover may be laterally inboard, or alternatively outboard, from the case cover attachment structures.

Still referring to the various figures, additionally or alternatively, the case cover may include a window portion that receives a screen member. The screen member, if present, may be a separate piece attached to the case cover using various methods including an adhesive, welding, or molding. Alternatively, the screen member may be formed with the case member but with a thickness that is different from other portions of the case member. In one aspect, the screen member may be formed of a clear material allowing viewing of a display of the electronic device. The screen member may have a thickness that allows a user to manipulate a touch screen of the electronic device through the screen member. The screen member, therefore, may be formed of a polycarbonate material and have a thickness of about 0.1 to 0.5 millimeters to permit a user to manipulate a touch screen with or without another screen protector applied to the electronic device. The screen member may also optionally include a screen that includes at least one port formed therein, into which a button feature may be positioned (such as through co-molding with the screen member).

Still referring to the various figures, the case may be formed by removably joining the housing with the case cover. In joining the case member and the case cover it will be appreciated that the planar surfaces of each may be generally aligned and opposed to each other. In addition, the two planar surfaces may be dimensioned so that a space is formed between the two structures.

Still referring to the various figures, the case gasket may be shaped or otherwise dimensioned to extend into the space between the case cover and the case member. The gasket may be attached to the case member or the case cover by mechanical, adhesive or other means (e.g., over molding). Although, in one aspect of the case the gasket may be formed as a separate member having a mounting portion that is mechanically secured to the case cover and a sealing portion that extends into the space between the two planar surfaces. The case gasket may also be formed from various thermoplastic elastomers such as a TPE-TPU material, or formed of other materials such as rubbers including silicone. In operation, the case gasket may provide a water and airtight seal for the case and the compression of the gasket may be maintained by the connection of the housing attachment structures with the case cover attachment structures.

Still referring to the various figures, the case member may also optionally include at least one membrane, such as a microphone membrane, that may be nonpermeable to water. The membrane may be formed from TPU with a thickness of 0.03 mm and adhesively mounted about a slot of the case member proximate a location of a microphone of the predetermined electronic device when the device is positioned in the case member. It will be appreciated, however, that other materials such as TPU, PI, PEN, PTFE, PVDF, PET or PC material, may also be used to form the membrane. A membrane gasket, formed of rubber or a foam such as poron, may be mounted to the membrane to standoff the electronic device from the membrane and to acoustically isolate a microphone of the device from ambient sound within the case (such as might be emitted by a speaker of the electronic device).

The protective air and watertight case disclosed herein may be formed in various embodiments, select examples for which are discussed infra.

Figure 2:
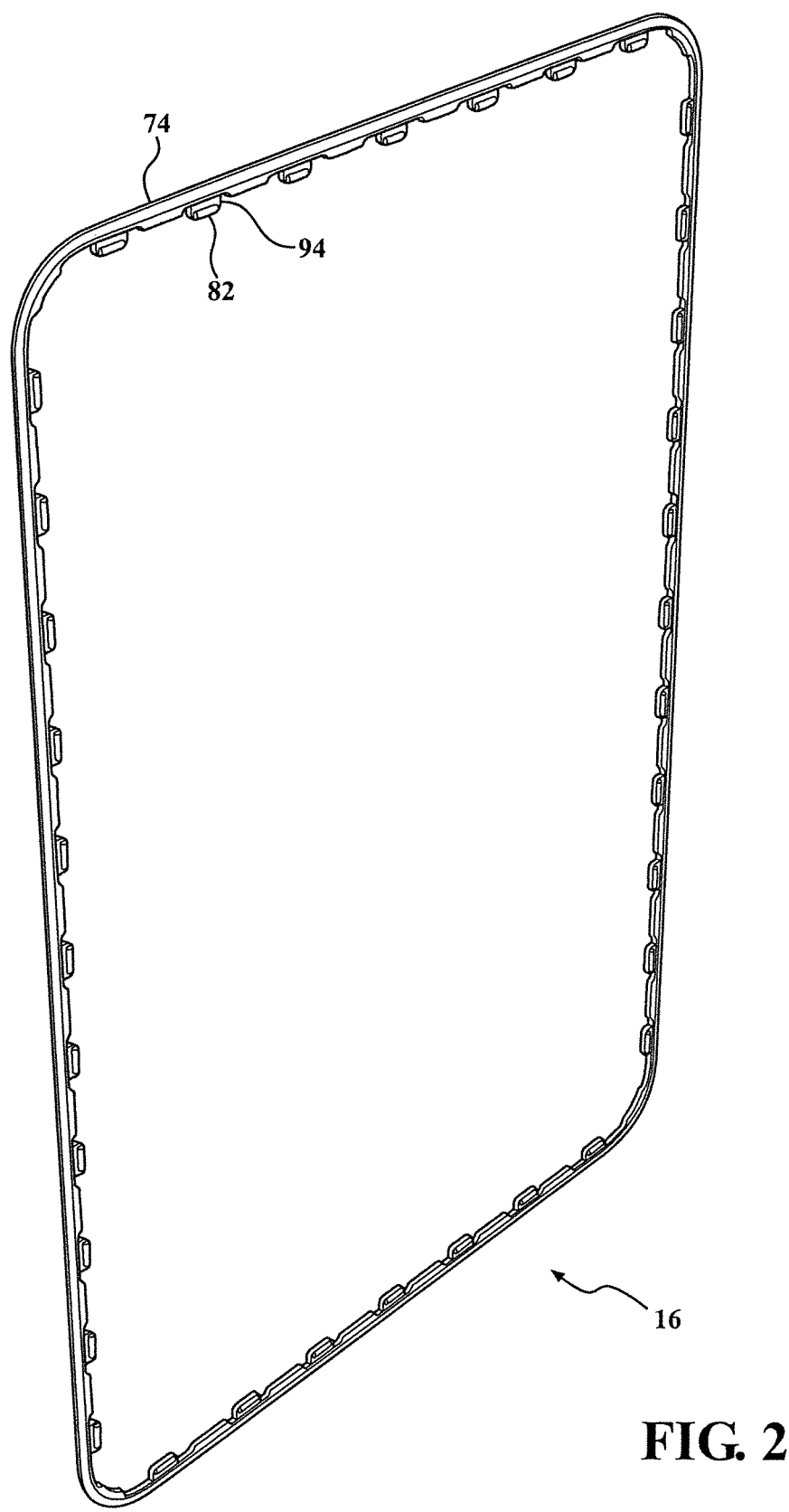
FIG. 2 is a perspective view of one embodiment of a case gasket.
Figure 3:
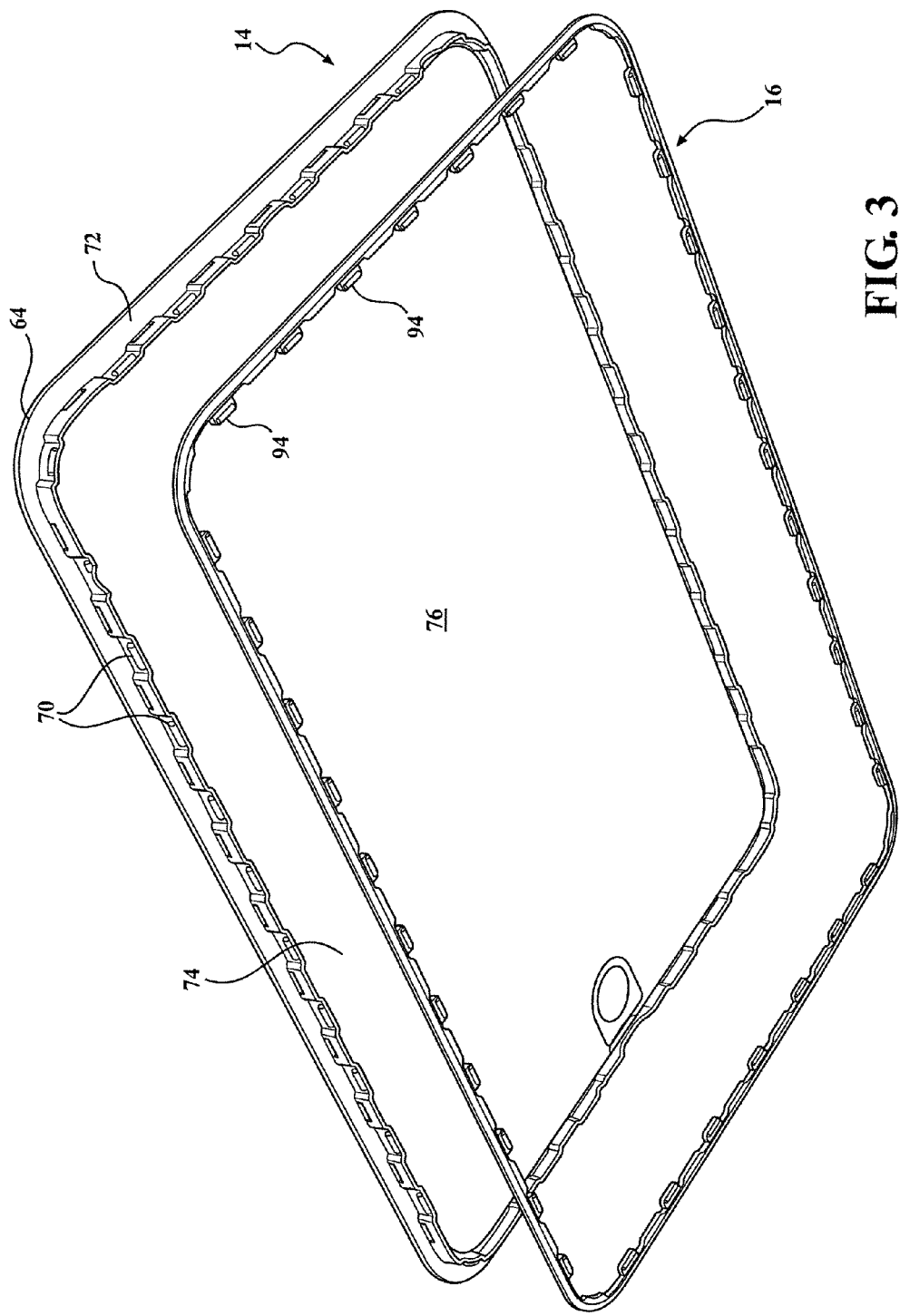
FIG. 3 is a perspective view of an embodiment of a case gasket unassembled from a case cover.

Referring to FIGS. 1-3 (see also FIGS. 13-15), one embodiment of a protective air and water tight case 10 may include a housing 12, a case cover 14 and a case gasket 16 positioned between the housing 12 and case cover 14. As shown, the case 10 and its component structures may have a generally rectangular shape. However, it will be appreciated that the case 10 may be shaped or otherwise dimensioned to be complimentary to the shape of any predetermined electronic device 500 (see e.g., FIG. 20).

As best shown in FIG. 1, the housing 12 may include a case member 18 (or case rear or bottom), into which the electronic device 500 may be received, with the case member 18 having wall 20 that defines an interior surface 22 and an exterior surface 24. The case member 18 may also include a plurality of housing attachment structures 26. The housing attachment structures 26 may be "snap" structures that may render an audible sound on engagement, or other manner of fixtures. Suitable examples of attachment structures 26 include a male projection or a female cavity 28 defined in the interior 22 or exterior surface of the case member 18.

Still referring to FIG. 1, the wall 20 of the case member 18 may also define an upper surface 30 that includes a generally planar surface 32 extending around the perimeter of the case member 18. This planar surface 32 may be positioned laterally inboard or outboard relative to the housing attachment structures 26 on the case member 18.

Still referring to FIG. 1, the case member 18 and/or housing 12 may optionally include various slots and access ports formed therein. The slots and access ports may be used to actuate various functions using buttons or switches and/or allow sound transmission, as will be described in more detail below. As best shown in FIG. 1, the slots may include a first 33, a second 34, and a third slot 35 slot, and the ports may include at least a first 36 and a second 38 acoustic port, a cable access port 40 and a mute toggle/mute silence rotating switch port 42. Button features 44, 46, 47 may be positioned in the slots 33, 34, 35, with seal members and/or gaskets positioned in the access port 40, and mute toggle/mute silence rotating switch gasket 48 positioned in the switch port 42. The case member 18 may also be shaped to include a lanyard support structure 54.

Continuing to refer to FIG. 1, the housing 12 may further include a rubber (e.g., TPE or silicon) bumper 56 co-molded to the exterior surface 24 of the case member 18 and so that with the rubber may extend through apertures (not shown) in wall 20 the case member 18 to form a plurality of ribs 58 extending from the interior surface 22.

Still referring to FIG. 1, the wall 20 of the case member 18 may have a generally uniform thickness. Additionally, or alternatively, the wall 20 may be dimensioned to define a recess 60 on the interior surface 22 of the case member 18 having a thickness in a range between 0.2 and 1.6 mm, with one preferred thickness for the recess being about 1.2 mm, and another preferred thickness being 1.2 mm.

Figure 4:
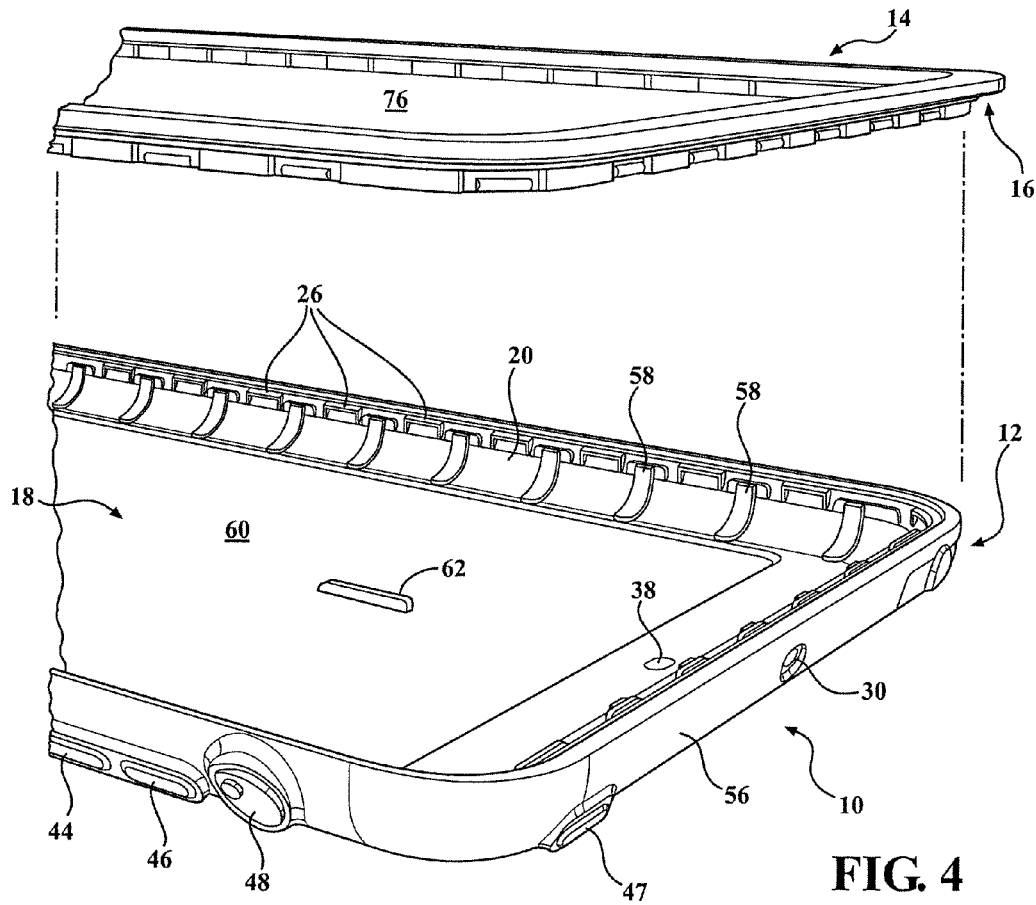
FIG. 4 is a partial perspective view of an embodiment of a protective air and water tight case, in which an embodiment of a case cover with an associated case gasket is displayed unjoined from an embodiment of a case member, and showing standoff rib(s) molded to the interior perimeter of the case member and a standoff flange within a recess of the case member.

Still referring to FIG. 1, the ribs 58 of the case member 18, or a similar structure (e.g., a channel (not shown) defined the interior surface 22), may extend from the recess 60 to a position proximate a location of a speaker of the predetermined electronic device 500 when position in the case member 18. When so positioned, one or more of the ribs 58 may serve to provide impact/drop protection to the electronic device 500. Additionally, or alternatively, the standoff member(s) may function to position a predetermined electronic device 500 in the case member 18 so that a speaker (not shown) of the electronic device 500 is spaced from the interior surface 22. Moreover, as shown in FIG. 4, other structures, such as a flange 62 may also be used as a standoff member(s).

Referring now to FIGS. 2 and 3, the case cover 14 (or case front or top) may include a body portion 64 from which may extend a flange or vertical portion 66. The flange or vertical portion 66 may be shaped to include a plurality of case cover attachment structures 68 that couple with the attachment structures 26 of case member 18. Each attachment structures 68 of the case cover 14 may, for example, include a male projection 70 configured to engage a female cavity 28 of the case member 18.

Still referring to FIGS. 2 and 3, the body portion 64 of the case cover 14 may also include a generally planar surface 72 that extends around a perimeter of the case cover 14. The planar surface 70 may be positioned laterally inboard, or alternatively outboard, from the case cover attachment structures 68. The body portion 64 may also be shaped so that, in an assembled configuration with the case member 18, the planar surface 72 is opposite the planar surface 32 of the case member 18.

Referring to FIGS. 1 and 3, the case cover 14 may optionally include a window portion 74 that may receive a screen member 74. The screen member 76, if present, may be a separate piece attached to the case cover 14 using various methods including using an adhesive 76, welding or molding. Alternatively, or additionally, the screen member 74 may be formed with the case cover 14 but with a thickness that is different from other portions of the case cover 14.

Referring now to FIGS. 1-4 and 5, it will be appreciated that the housing 12, and particularly the case member 18, and case cover 14 may be removably joined together by engagement of the respective attachment structures 26, 68. Moreover, when so joined, a space 78 may be formed between the planar surface 72 of the case cover 14 and the opposing planar perimeter surface 32 of the case member 18.

Referring now to FIGS. 2 and 3, the case gasket 16 may be mechanically attached to the case cover 14, with a sealing portion 74 of the gasket 16 extending into the space 78 defined by the planar surfaces 32, 72 and being axially compressed between the surfaces 32, 72 to provide a water and air tight seal for the case 10.

Figure 5:
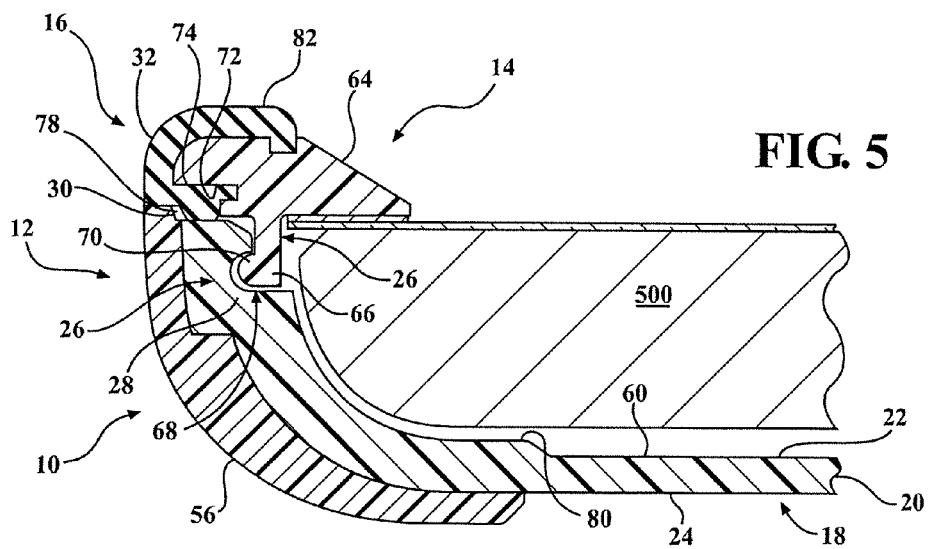
FIG. 5 is a planar side cutaway view of an embodiment of the protective air and water tight case in which the case gasket is a separate element, mechanically attached to the case cover, the gasket being secured to the case cover by a mounting portion and with a sealing portion extending into a spaced defined by a planar perimeter surfaces, and the sealing portion being positioned outboard from the attachment structures, with the air passage and recess also being shown.

Referring again to FIGS. 1-4, and as best shown in FIG. 5, as mentioned supra, the interior surface 22 of the case member 18 may includes the ribs 44 (and/or other standoff member e.g., channel or flange 62) or it may be otherwise dimensioned to form an air pathway 80 or passage that extends from proximate a location of a speaker (not shown) of a predetermined electronic device 500 to the recess 60. Thus, it will be appreciated that the air pathway 80 may operate to permit sound from the speaker of the electronic device 500 to move from the speaker, down to the recess 60, and then out to the environment through the thin wall of the recess 60.

It will also be appreciated that various means exist for attaching the case gasket 16 to the case cover 14, or to the cover member 18. For example, referring now to FIG. 5, in one embodiment of the case 10 the case gasket 16 may include a C-shaped mounting portion 82 secured about a complimentary shaped body portion 64 of the case cover 14. The gasket 16 may further include a sealing portion 74 that, as mentioned supra, extends into the space 78 between the opposing planar surfaces 32, 72 of the case member 18 and case cover 14. In addition, the sealing portion 74 of the gasket 16 may engage a bumper 56 assembled on the exterior surface 24 of the case member 18 to provide protection from dust and other contaminants.

Figure 6:
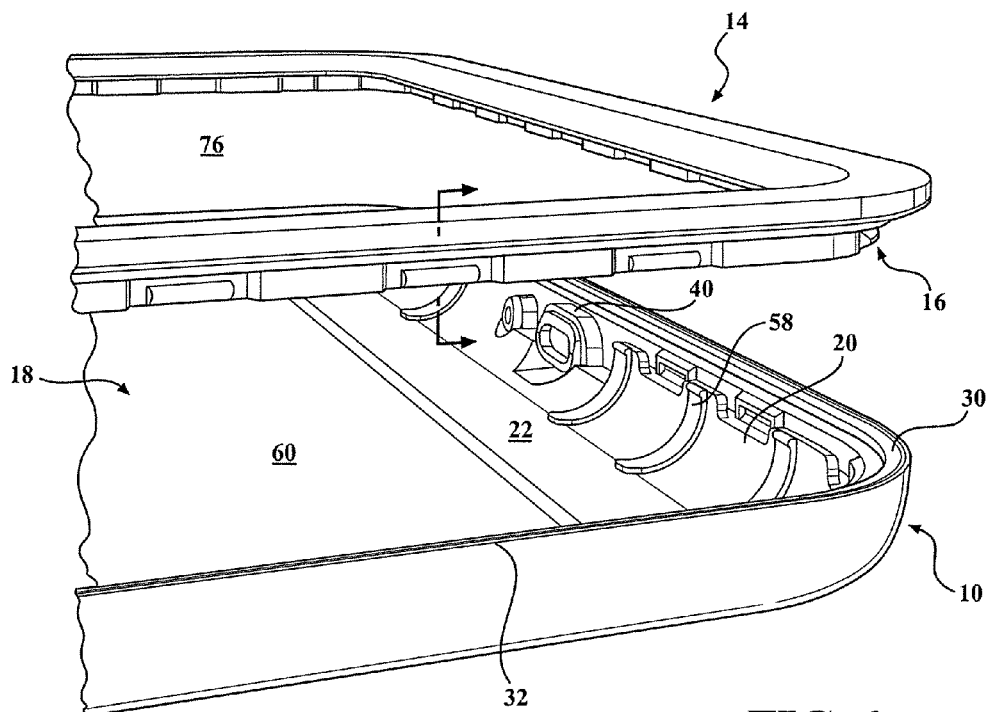
FIG. 6 is a partial perspective view of an embodiment of a protective air and water tight case in which is an embodiment of a case cover with an associated case gasket is displayed unjoined from an embodiment of a case member, and showing attachment structures on the case member and case cover, standoff ribs molded to the interior perimeter of the case member, and at least one (charging) port.
Figure 7:
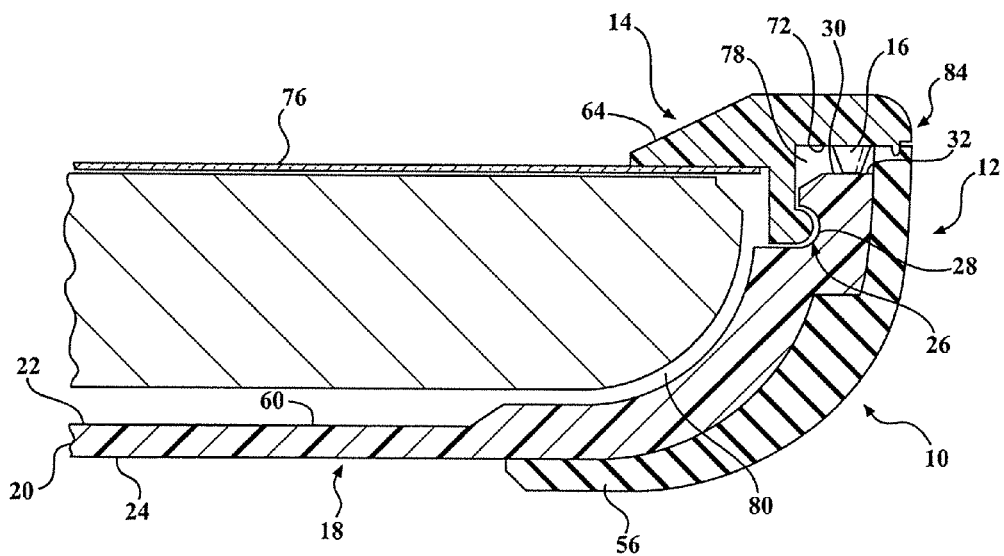
FIG. 7 is a partial planar side cutaway view of an embodiment of the protective air and water tight case shown in FIG. 6, in which the case gasket is adhesively attached to the case cover outboard from the attachment structures, and the case cover includes a dust seal projection that engages a dust seal groove formed in a bumper molded to the case member, with the air passage and recess also being shown.
Figure 8:
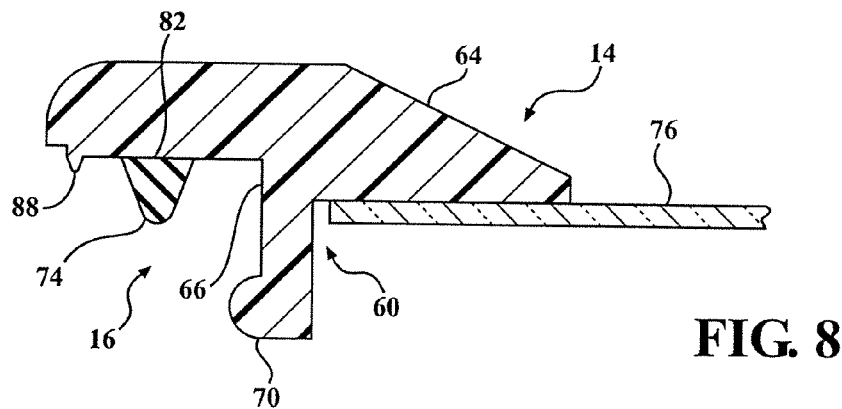
FIG. 8 is a partial planar side cutaway view of the case cover of FIG. 7.

Referring now to FIGS. 6, 7 and 8, there is shown an embodiment of case 10 in which the case gasket 16 is adhesively mounted to the planar surface 72 of the case cover 14. In addition, the case 10 may include a dust seal 84 formed from a male member 86 on the body portion 64 of the case cover 14 that engages a female groove 88 formed in a bumper 56 of the housing 12.

Figure 9:
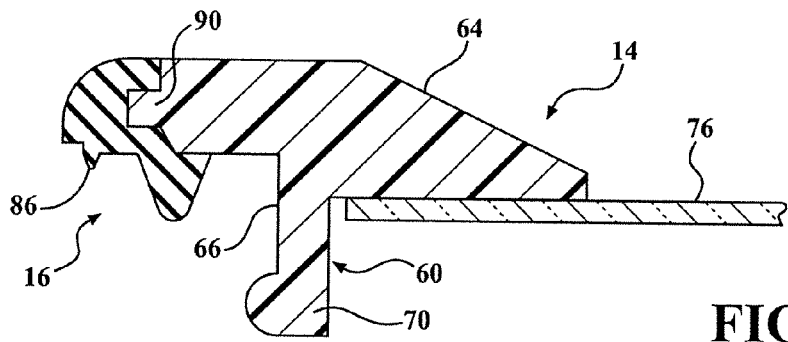
FIG. 9 is a partial planar side cutaway view of another embodiment for the case cover in which the case gasket is co-molded or alternatively mechanically attached to the case cover by a mounting portion, and a sealing portion extends into the spaced defined by the planar perimeter surfaces, and in which the gasket is also formed to include the dust seal.

Referring now to FIG. 9, there is shown an embodiment of the case 10 in which the case gasket 16 is molded to the body portion 64 of the case cover 14. Specifically, a mounting portion 82 of the case gasket 16 may be co-molded about a pin 90 that extends radially outward from the body portion 64.

Figure 10:
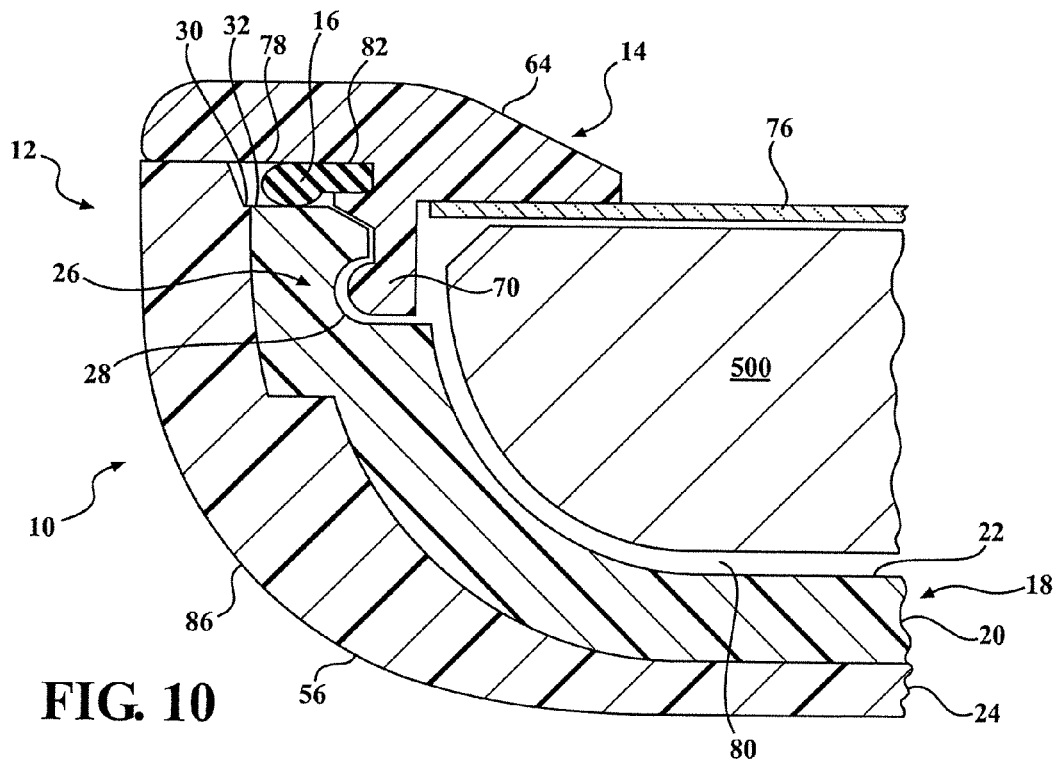
FIG. 10 is a partial planar side cutaway view of an embodiment of the protective air and water tight case, in which the case gasket includes a mounting portion mechanical secured/fitted into a groove in the case cover, and with a seal portion that extends into the space outboard from the attachment structures.

Referring now to FIG. 10, there is shown an embodiment of the case 10 in which the case gasket 16 is mechanically attached to the flange 66 of the case cover 14. Specifically, a mounting portion 82 of the case gasket 16 may be secured in a groove 92 defined in the flange 66 of the case gasket 16, between the attachment structure 68 and the body portion 64, and so that the sealing portion 74 extends to the space 78 between the case cover 16 and the case member 18.

Figure 11:
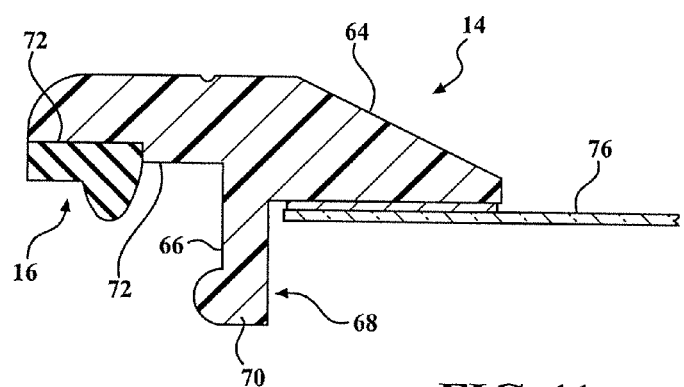
FIG. 11 is a partial planar side cutaway view of another embodiment for the case cover in which the case gasket is over-molded to the case cover.
Figure 12:
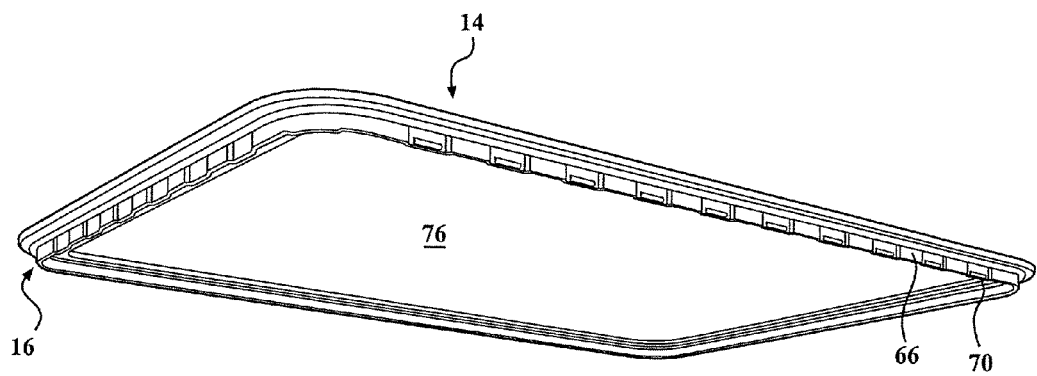
FIG. 12 is a perspective view of the case cover and gasket of FIG. 11.

Referring now to FIGS. 11 and 12, there is shown an embodiment of the case 10 in which the case gasket 16 is attached to the case cover 14 by over molding the case gasket 16 to the generally planar surface 62 of the body of the case cover 14.

Figure 13:
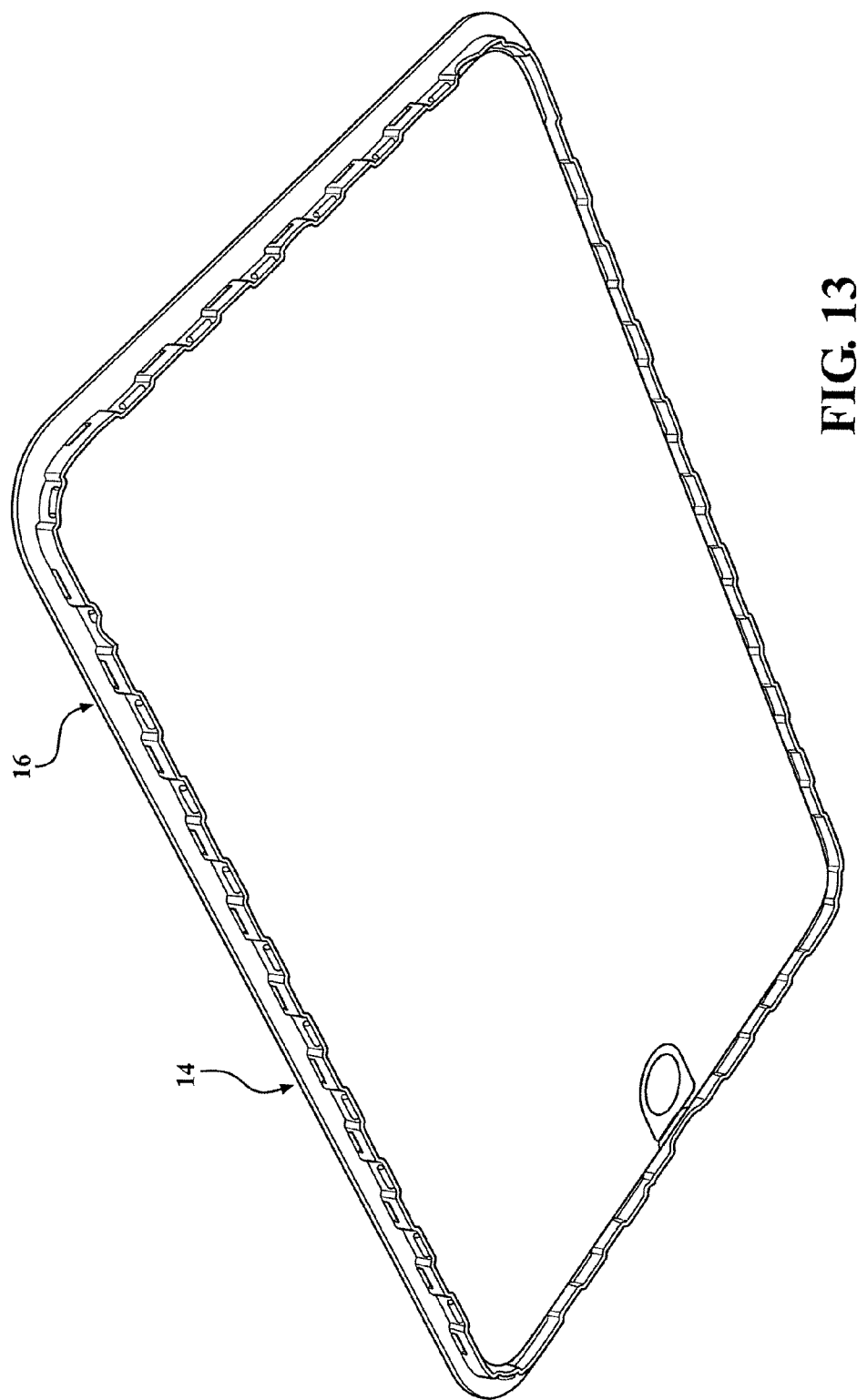
FIG. 13 is a perspective view of a case cover with a mechanically attached cover gasket of FIGS. 2 and 3.
Figure 14:
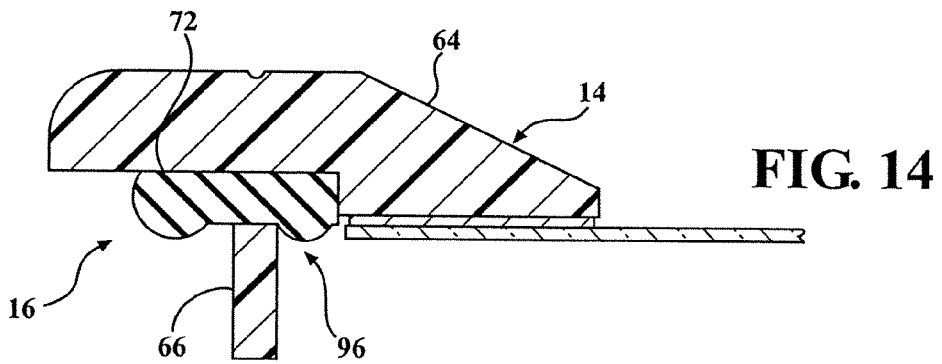
FIG. 14 is a partial planar side cutaway view of the case cover and cover gasket of FIG. 13 (see also FIGS. 1-3) in which the gasket is shown to include a mounting portion/tab that extends through an aperture defined in the case cover.
Figure 15:
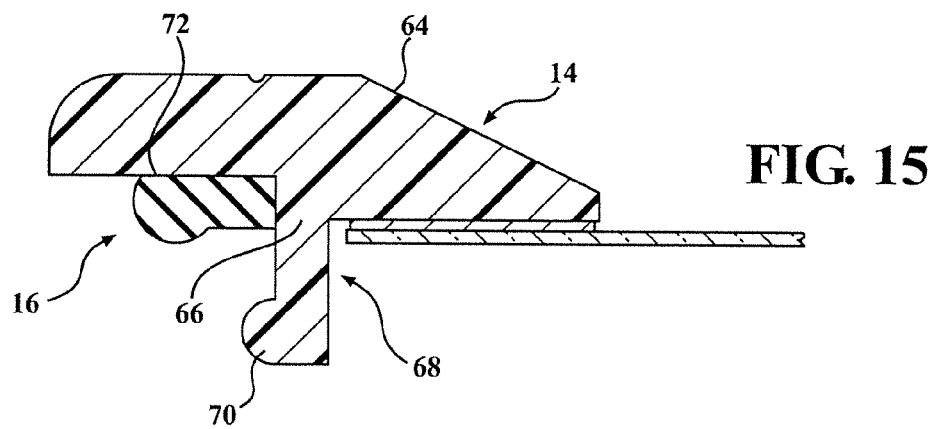
FIG. 15 is a partial planar side cutaway view of the case cover and cover gasket of FIG. 13 (see also FIGS. 1-3) showing the seal portion of the gasket at a location between apertures in the case cover.

Referring now to FIGS. 13, 14 and 15, there are shown further views of the embodiment of the case 10 of FIGS. 1-3, in which the case gasket 16 is mechanically attached to the case cover 14. More specifically, as best shown in FIG. 14, the flange 66 or vertical portion of the case cover 14 may include a plurality of apertures 92 that are each engaged by one of a plurality of tabs 94 of the case gasket 16. The tabs 94 may be squeezed into a cavity 96 formed by the body portion 64 and flange 66 and thus be held in place by friction of the undercut.

Figure 16:
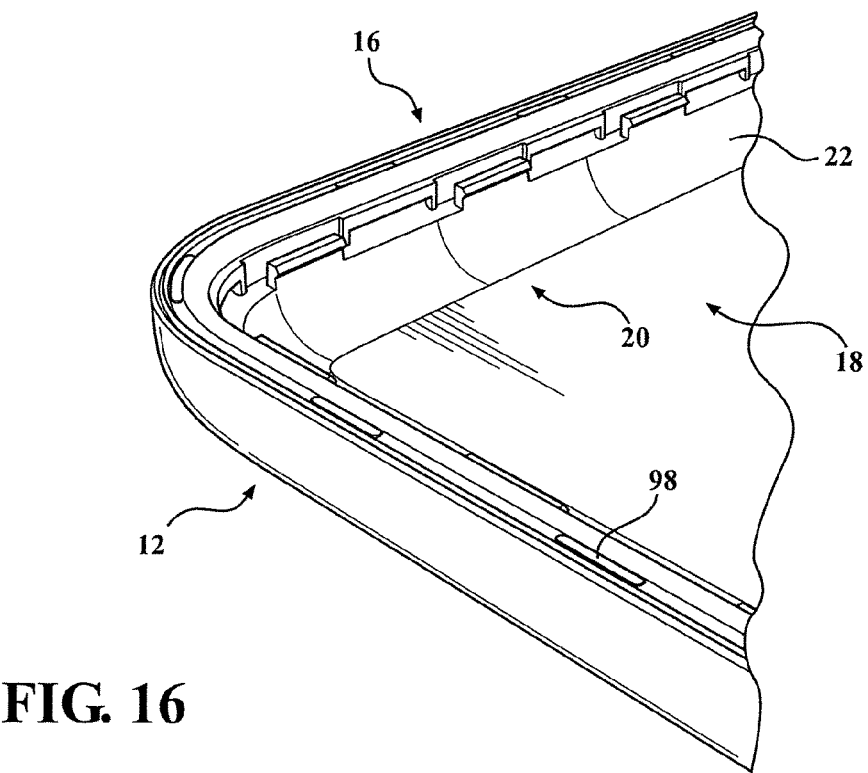
FIG. 16 is a partial perspective view of the case member and cover gasket, in which the gasket is shown as a separate molded element mechanically mounted to the case member, and in which (similar to FIG. 13) the gasket extends through an aperture defined through a flange or lip on the case member.
Figure 17A:
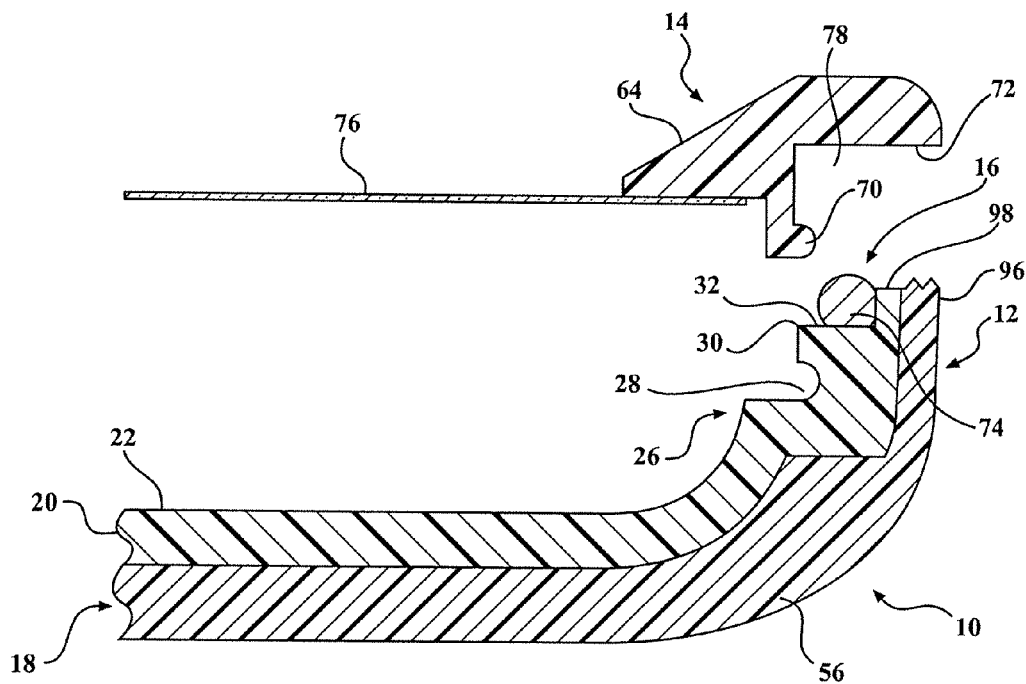
FIG. 17A is a partial planar side cutaway view of the case cover joined with the case member and cover gasket, and in which the gasket is shown as a separate molded element mechanically mounted to the case member, and in which (similar to FIG. 13) the gasket extends through an aperture defined through a flange or lip on the case member.
Figure 17B:
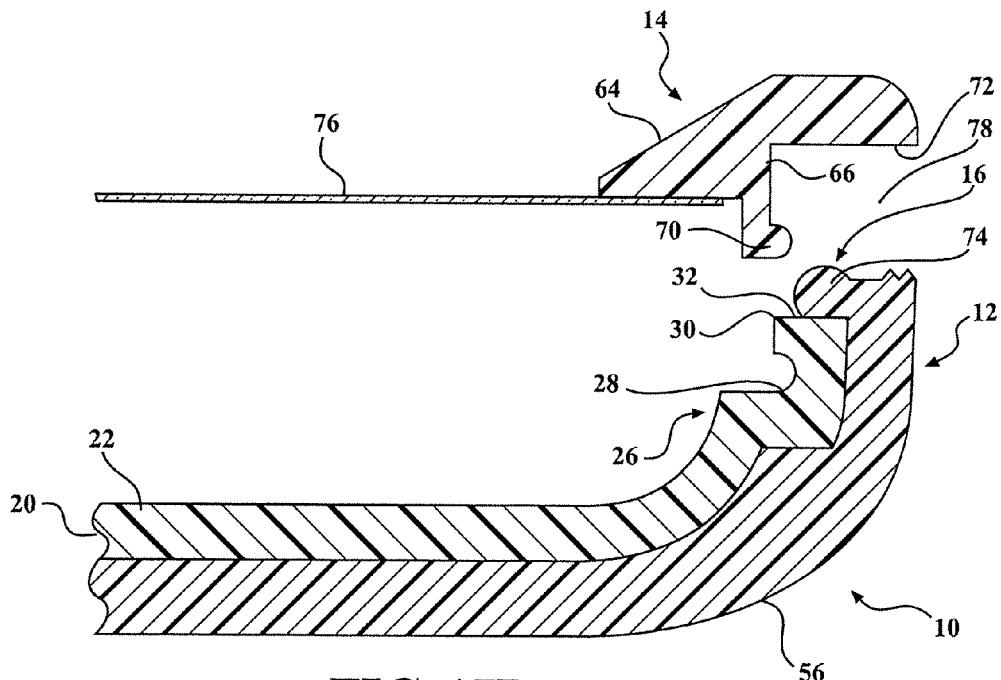
FIG. 17B is a partial planar side cutaway view of the case cover, case member and cover gasket of FIG. 16 at a location between apertures in the case cover.

Referring now to FIGS. 16, 17A and 17B, there is shown in embodiment of the case 10 in which the case gasket 16 is formed as part of the bumper 56. As best shown in FIG. 16, the sealing portion 74 of the case gasket 16 may extend through apertures 96 defined in a vertically extending lip 98 formed about a perimeter of the upper surface 30 of the planar surface 32 of the case member 18.

Figure 18:
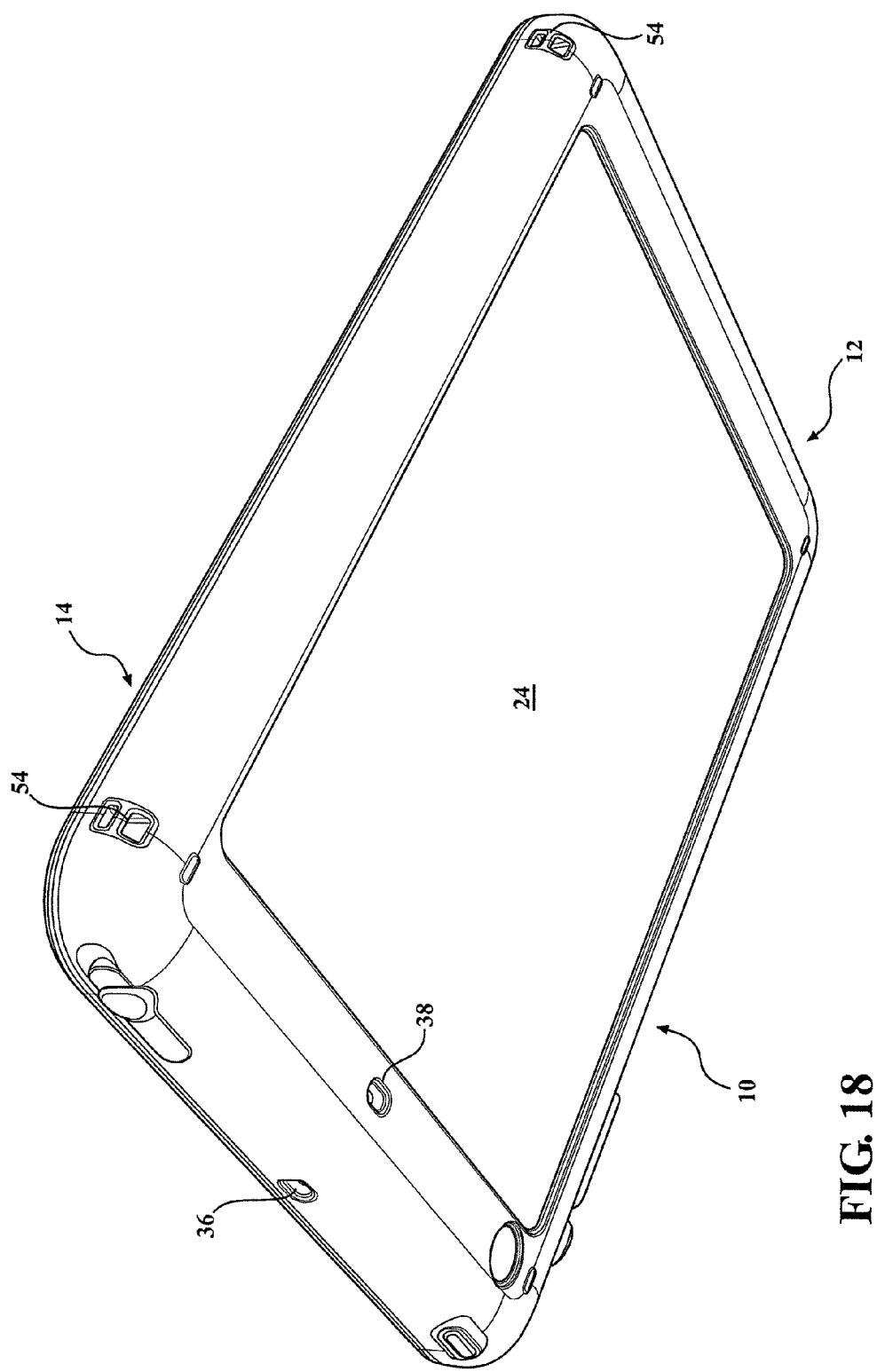
FIG. 18 is a perspective view of an embodiment of the housing of the case.
Figure 19:
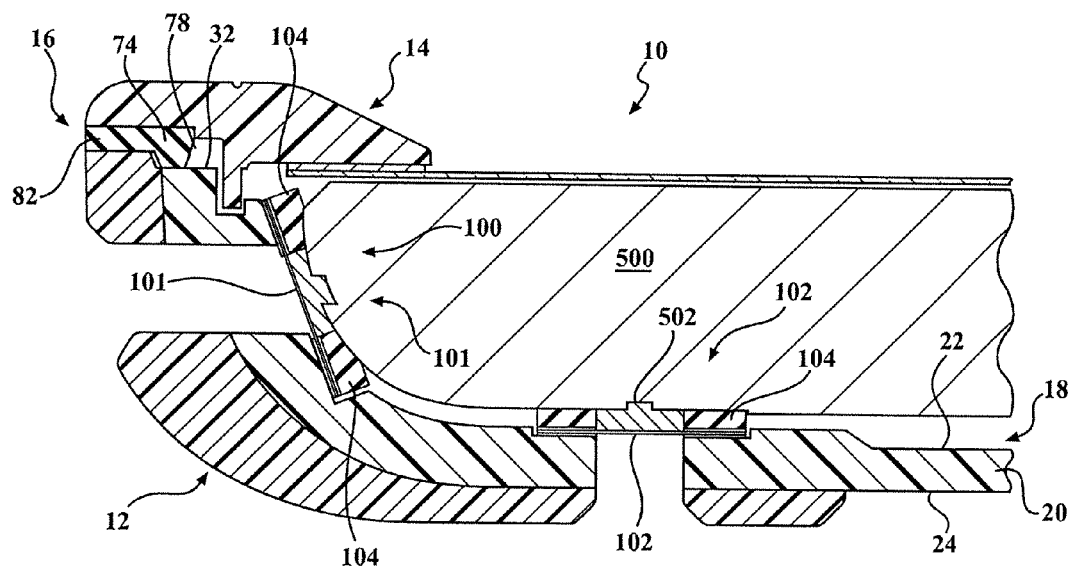
FIG. 19 is partial planar side cutaway view of the case cover, case member and gasket, and showing a first and a second (acoustic) port with an (acoustic) membrane in each port.

Referring now to FIGS. 18 and 19, acoustic membrane assemblies 100, 101 may be positioned in the first 36 and second 38 acoustic ports of the case member 18. Each microphone or acoustic membrane assembly 100, 101, may include an acoustic membrane 102 mounted, using a adhesive having a thickness in the range of 0.005 mm to 0.4 mm, to one side to the interior surface 22 of the case member 18 about each port 36, 38. The membrane 102 may be in the form of a thin film or sheet of material that covers the opening of the port 36, 38, and is attached to the interior surface 22 the case member 18 so as to prevent entry of water and air allowing for a clear transmission of sound. The membrane 102 material may be that as described above. It will be appreciated, however, that membrane material having the requisite properties that permit the transmission of sound clearly and without degradation of the bass frequencies, and prevents feedback and echoes within the case, may be preferred. An acoustic gasket 104, formed for example of rubber, may also be mounted to the other side of each membrane 102 to standoff the membrane from the electronic device 500 and to acoustically isolate a device microphone 502 from ambient sound within the case 10 (such as might be emitted by a speaker of the electronic device 500).

In addition, it will be appreciated that the acoustic membrane assemblies 100, 101 may also be used in connection with other functions of the electronic device 500, such as functioning as a protective barrier for a device flash (not shown).

Figure 20:
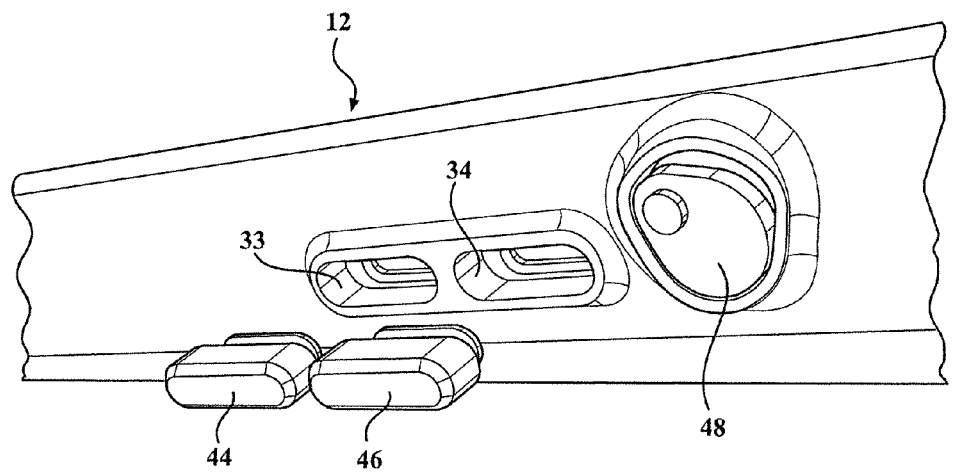
FIG. 20 is a partial perspective view of separate button features and a gasket.
Figure 21:
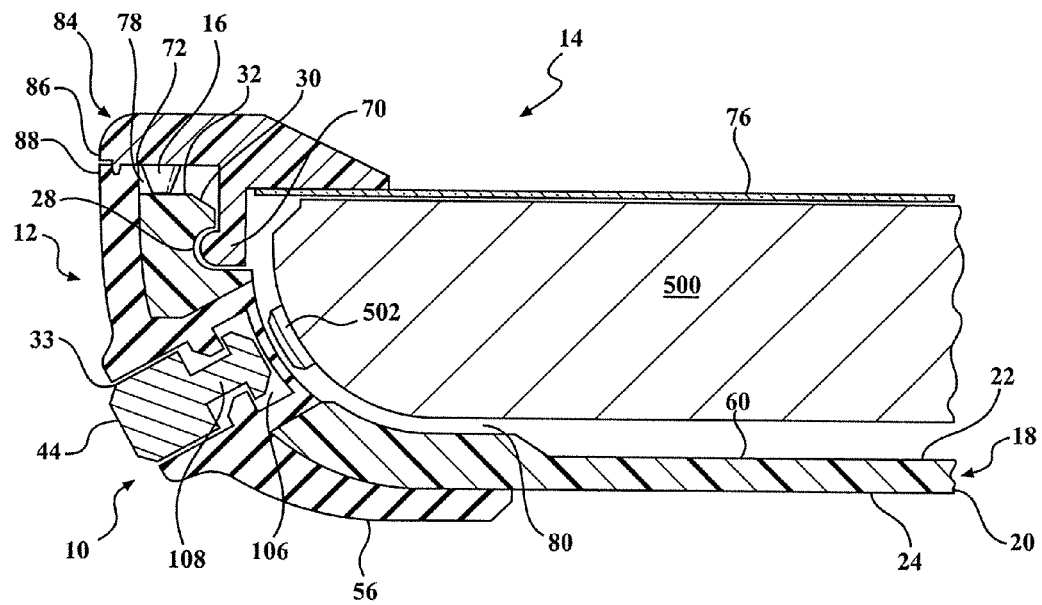
FIG. 21 is a partial planar side cutaway view of the case cover, case member and gasket, and showing a button feature.
Figure 22:
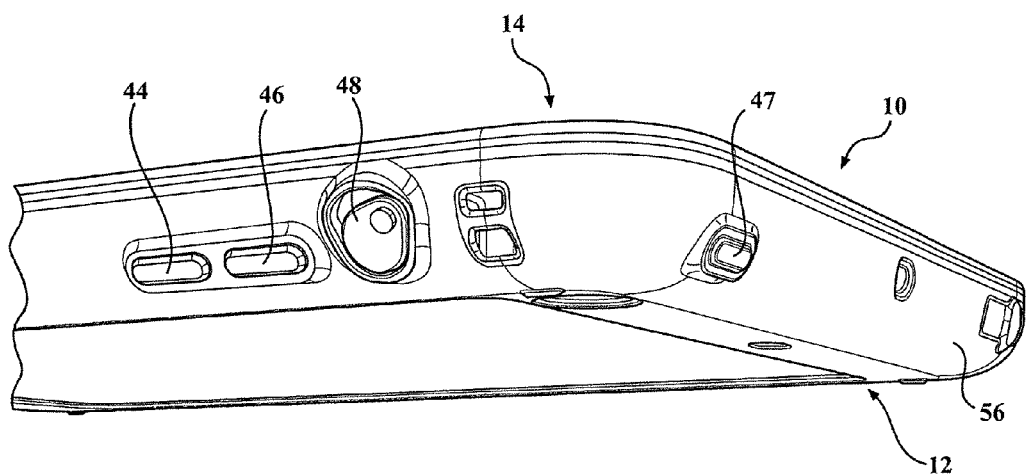
FIG. 22 is a partial perspective view of separate button features and an mute toggle/mute silence rotating switch gasket.
Figure 23:
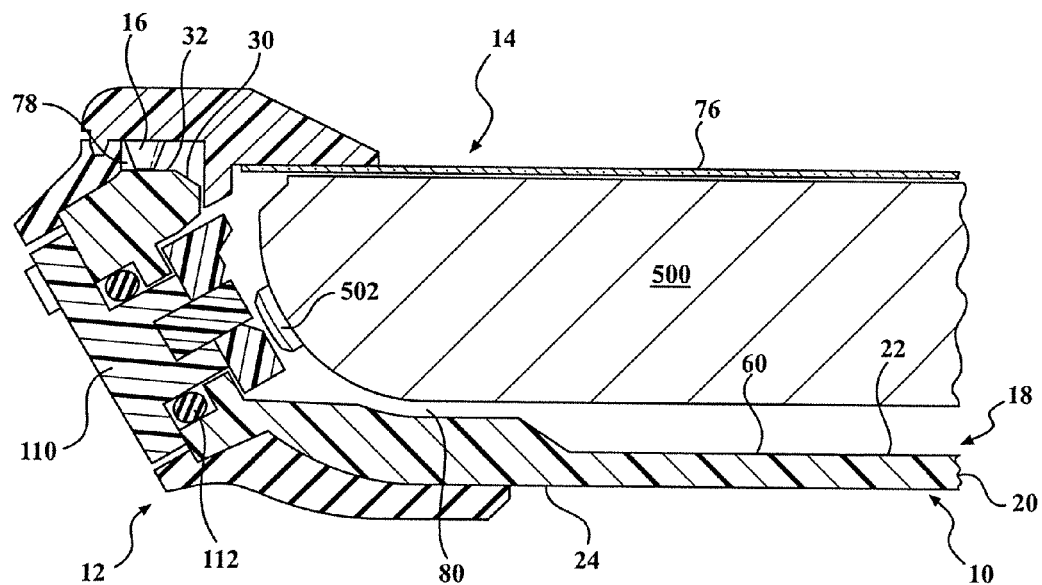
FIG. 23 is a partial planar side cutaway view of the case cover, case member and gasket, and showing a mute toggle/mute silence rotating switch gasket.

Referring now to FIGS. 20, 21, 22 and 23, the case 10 may include button features 44, 46, 47 in the slots 33, 34, 35 and also a mute toggle/mute silence rotating switch gasket 48 positioned in the port 42 that is positioned in respective ports and slots of the case 10 to permit actuation and use of the electronic device 500 within the case 10. For example as shown in FIGS. 20 and 21 the first slot 33 may be formed in the case member 18 (an also, additionally, the bumper 56) to include a button retention space 106 having a floor 108 positioned opposite a button 504 of the electronic device 500 when the device 500 is positioned in the case 10. The button retention space 106 may receive a catch portion 108 of a rubber button feature 44. As shown in FIG. 23, the switch gasket 48 may include a body 110 having an o-ring 112 that operates to seal the port 42.

Having described various embodiments of the case 10, various other embodiments will become apparent to those of skill in the art that do not depart from the scope of the claims.

We claim:

1. An air and water tight case for an electronic device, the case comprising:

a housing including a case member, the case member including a plurality of housing attachment structures, at least one slot and at least one port formed therein, the case member also including a planar perimeter surface laterally outboard from the housing attachment structures, and the case member further including a wall defining an interior surface and an exterior surface, the wall being dimensioned to define a recess in the interior surface at which at least a portion of the wall has a thickness of between .2 mm and 1.6 mm, and the wall being further dimensioned to define an air pathway extending from the recess to a position proximate a location of a speaker of the predetermined electronic device when positioned in the case member;

a case cover including a plurality of case cover attachment structures formed thereon and shaped to couple with the plurality of housing attachment structures, and the case cover further including a planar perimeter surface laterally outboard from the case cover attachment structures;

the housing and case cover being removably joined and forming a space defined by the planar perimeter surface of the case cover being opposed by the planar perimeter surface of the case member;

a gasket mechanically attached to the case cover, the gasket extending into the space and being axially compressed between the planar perimeter surface of the case member and the planar perimeter surface of the case cover to provide a water and air tight seal, wherein compression of the gasket is maintained by the connection of the housing attachment structures and the case cover attachment structures, and wherein the gasket and the case cover create a space for receiving and frictionally securing the case member;

at least one membrane positioned in the slot of the case member proximate a location of a microphone of the predetermined electronic device when the device is positioned in the case member.

2. The case of claim 1, wherein the membrane includes a membrane gasket.

3. The case of claim 2, wherein the membrane gasket is dimensioned to be contacted by the predetermined electronic device and to standoff the predetermined electronic device from the interior surface and to acoustically isolate a microphone of the predetermined electronic device from ambient sound within the case.

4. The case of claim 1, wherein the membrane is nonpermeable to air and water.

5. The case of claim 1, wherein the membrane has a thickness of from 5 microns up to 2000 microns.

6. The case of claim 1, wherein the membrane has a Young's Modulus from 50 MPa up to 80 GPa.

7. The case of claim 1, wherein the membrane has a density from 500 kg/m3 up to 2500 kg/m3.

8. The case of claim 1, wherein the membrane is formed of a TPU, PI, PEN, PTFE, PVDF, PET or PC material.

9. The case of claim 1 wherein each of the housing attachment structures comprise a female cavity.

10. The case of claim 9 wherein each of the case cover attachment structures comprises a male projection.

11. The case of claim 1, where the wall has a thickness at the recess of 1.2 mm.

12. The case of claim 1, wherein the case cover further comprises a screen.

13. The case of claim 12, wherein the screen further comprises at least one port formed therein, and at least one button feature is assembled to the port of the screen.

14. A protective case for an electronic device comprising:
a housing including a case member, the case member including a plurality of housing snap attachment structures formed therein;

a case cover including case cover snap attachment structures formed thereon that couple with the housing snap fit structures;

the main housing and case cover removably joined to define an air and water tight volume receiving an electronic device; and a gasket positioned between planar surfaces of the case member and case cover and is molded to the body portion of the case cover, wherein the gasket is axially compressed between the case member and the case cover to provide a water and air tight seal and wherein the compression of the gasket is maintained by the connection of the housing snap attachment structures and the case cover snap attachment structures, wherein the gasket and the case cover create a space for receiving and frictionally securing the case member.

15. The protective case of claim 14 wherein connection of the case cover and housing snap attachment structures defines a separate space receiving the gasket.

16. The protective case of claim 15 wherein the case cover and housing snap attachment structures are formed laterally inboard in relation to the separate space.

17. The protective case of claim 15 wherein the case cover and housing snap attachment structures are formed laterally outboard in relation to the separate space.

18. The protective case of claim 17 wherein the gasket is mechanically attached to the case cover.

19. A protective case for an electronic device comprising:
a housing including a case member, the case member being dimensioned to receive a predetermined electronic device and including at least one slot and a plurality of housing snap attachment structures formed therein;

a case cover including case cover snap attachment structures formed thereon that couple with the housing snap fit structures;

the housing and case cover removably joined to define an air and water tight volume receiving an electronic device;

a gasket positioned between planar surfaces of the case member and case cover wherein the gasket is axially compressed between the case member and the case cover to provide a water and air tight seal and wherein the compression of the gasket is maintained by the connection of the housing snap attachment structures and the case cover snap attachment structures, wherein the gasket and the case cover create a space for receiving and frictionally securing the case member; and at least one membrane positioned in the at least one slot of the case member proximate a location of a microphone of the predetermined electronic device when the device is positioned in the case member.

* * * * *